2 Sheets—Sheet 1.
R. EMERSON.
Harvester.
No. 200,705. Patented Feb. 26, 1878.
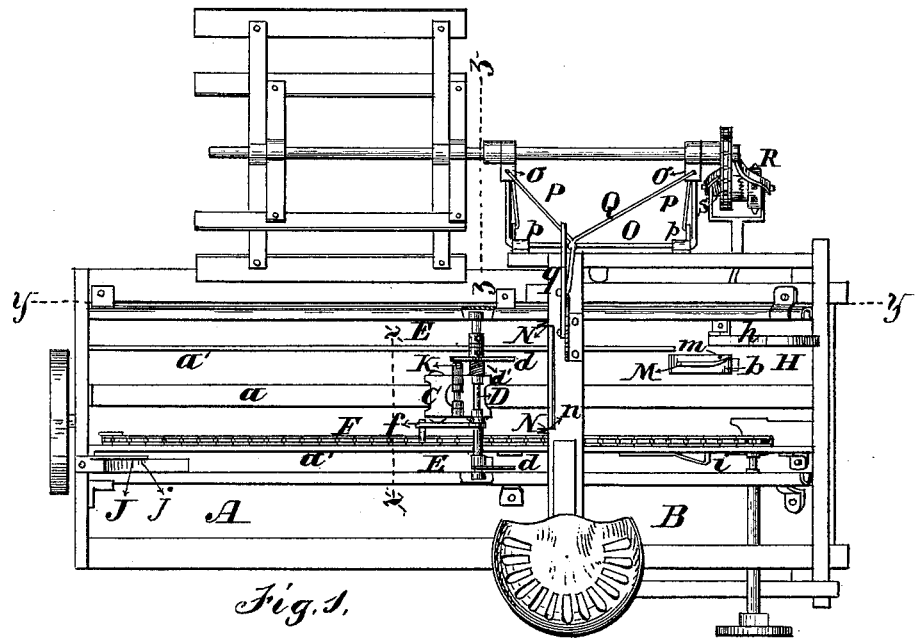
Fig. 1.
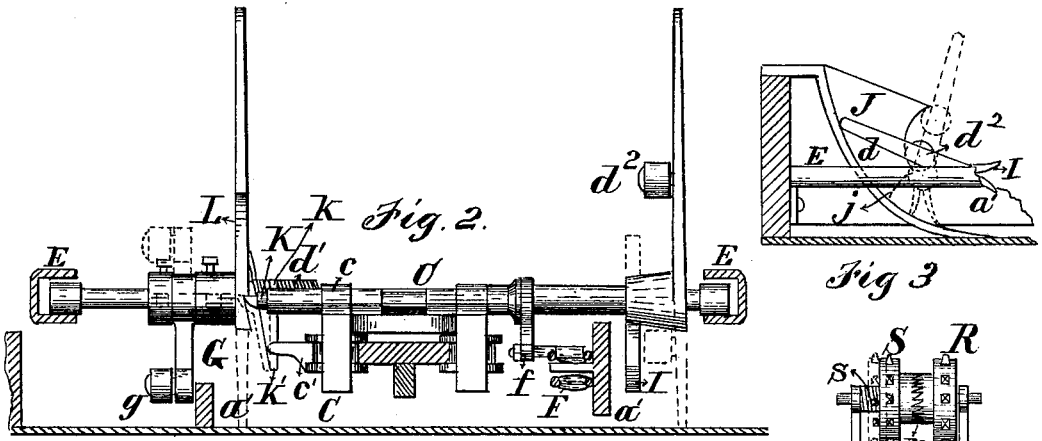
Fig. 2.
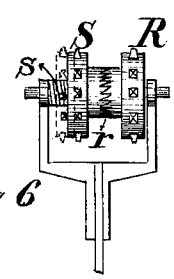
Fig. 3
Fig. 6
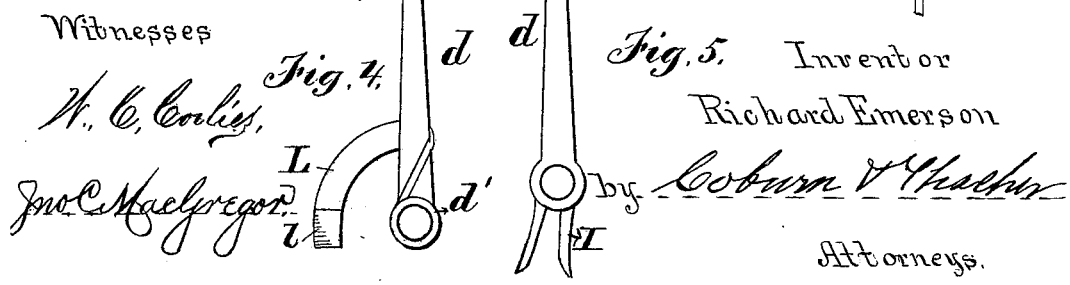
Witnesses
W. C. Corliss
Jno. C. MacGregor
Fig. 4. Fig. 5.
Inventor
Richard Emerson
by Coburn & Thacher
Attorneys.
N. PETERS, PHOTO-LITHOGRAPHER, WASHINGTON, D. C.

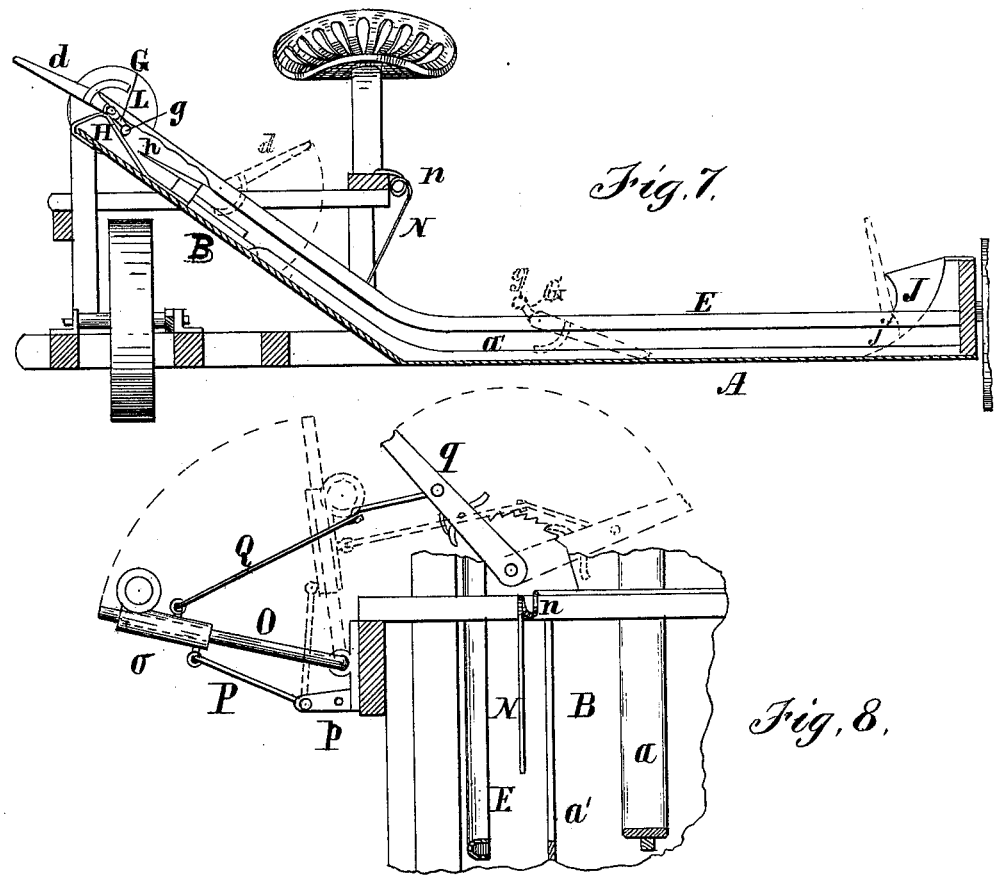

UNITED STATES PATENT OFFICE.

RICHARD EMERSON, OF SYCAMORE, ILLINOIS, ASSIGNOR OF ONE-HALF HIS RIGHT TO HORATIO H. MASON, OF SAME PLACE.

IMPROVEMENT IN HARVESTERS.

Specification forming part of Letters Patent No. 200,705, dated February 26, 1878; application filed September 1, 1877.

*To all whom it may concern:*

Be it known that I, RICHARD EMERSON, of Sycamore, in the county of De Kalb and State of Illinois, have invented a new and useful Improvement in Harvesters, which is fully described in the following specification, reference being had to the accompanying drawings, in which—

Figure 1 represents a plan view of a harvester embodying my improvements; Fig. 2, a cross-section on an enlarged scale, taken on the line $x\ x$, Fig. 1, showing the mechanism of the rake; Fig. 3, a detail view of the mechanism for throwing the rake up at the outer end of the platform; Fig. 4, a detail view of the rake, showing the locking-arm; Fig. 5, a similar view, showing the projections for turning the rake back at the upper end of the incline; Fig. 6, a detail view of the spring-clutch arrangement in the mechanism for driving the reel; Fig. 7, a longitudinal section taken on the line $y\ y$, Fig. 1; and Fig. 8, a detail transverse section, showing the reel-support, taken on the line $z\ z$, Fig. 1.

My invention relates to that class of machines in which the binding is done upon the machine, either automatically or by hand, and is intended to provide a raking mechanism for delivering the grain in gavels to the binder or binders, instead of in a constant stream, as is usual in this class of machines.

The invention consists in an elastic guard arranged over the lower portion of the incline, for compressing the gavel as it is carried up by the rake, and sweeping back all scatterings.

It also consists in a link connecting the sliding bearings of the reel on a vibrating frame with the stationary supporting-bar, whereby, as the frame is vibrated, the bearings are simultaneously adjusted thereon.

It also consists in various devices and combinations of devices, all of which will be hereinafter more fully set forth.

In the drawings, A represents the grain-platform of a harvesting-machine, which is supported by the main frame, in which the carrying-wheel is mounted, in the ordinary manner.

The machine is also provided with an incline, B, leading up from the inner end of the platform, over and outside of the main wheel. Upon this platform is a wide rail or way, $a$, arranged near the middle of the platform, and extending its entire length and up the incline B. Upon this way is mounted the rake-carriage C, which consists of two parts, hinged together, and provided with anti-friction rollers, similar to that heretofore described and patented by me. On the forward portion of this carriage is mounted the rake head or shaft D, upon which are the rake-teeth $d$. This shaft is mounted upon the carriage in bearings, so that it may be partially rotated, and extends out at each end to grooved guideways E, in the grooves of which the ends of the rake-head are arranged to run, being provided with rollers to relieve the friction. These guideways are arranged one at the front of and the other near the rear of the platform, along which they extend, and up the incline B.

An endless chain, F, passes around sprocket-wheels at the outer end of the grain-platform and upper end of the incline, and underneath suitable guide-rollers, whereby it is caused to follow the contour of the platform and incline. The rake is attached to this chain by means of a pitman, $f$, so that as the chain is driven by rotating the sprocket-wheels the rake will receive a reciprocating motion, being carried the whole length of the platform and incline, and back again in the same path, in a manner already well known.

Ribs $a'$ also extend along the platform and up the incline between the guideways and the carriage-rail for the rake. These ribs should be wide enough to extend up nearly or quite to the rake-shaft, and serve not only to support the grain and prevent it from becoming tangled with the raking mechanism, but also as a means of attachment for various smaller devices.

On the rake-shaft, near its forward end, is a rigid arm, G, carrying upon its outer end a friction-roller, $g$, and at the extreme upper end of the incline is a cam, H, arranged directly in the path of the roller $g$, so that when the rake reaches this point of the incline it will be turned forward and downward, as shown in Fig. 7 of the drawings. A spring-switch, $h$, is arranged just below the cam H, under which the roller $g$ passes on its upward course, at the same time raising the free end of the switch, which closes after the roller passes it, thereby causing the latter to pass above it on the return movement of the rake.

On the rear end of the rake-shaft is a rigid fork-arm, I, projecting from the shaft in an opposite direction to the rake-teeth. A spring cam or stop, $i$, is attached to the rear side of the rear rib $a'$, toward the upper end of the incline. As the rake is carried up this stop is depressed by the arm I passing along against it; but as the rake begins to return, being kept in a depressed position by the arm G and switch $h$, the fork of the arm I will be caught by the stop $i$ and the rake turned backward until the teeth are entirely depressed below the level of the platform, in which position the rake is carried back underneath the platform, as shown in dotted lines in Fig. 7 of the drawings.

A coiled spring, $d^1$, is placed upon the rake-shaft just outside the carriage, which is arranged to act in a backward direction, thereby assisting to throw the teeth down, as described, and hold them in this position.

At the outer end of the platform, just inside the rear guideway E, is a curved guide, J, against which the extreme rear tooth of the rake strikes as it is brought back to this end of the platform, thereby turning up the latter, as shown in Fig. 3 of the drawings. This movement is completed by means of a cam, $j$, projecting inward from the guide J, against which a pin, $d^2$, on the rake-tooth strikes, as shown in the same figure of the drawings, the pin being provided with an anti-friction roller, if desired.

As will be readily seen, this guide and cam will throw the rake up into working position at the extreme outer end of the platform, and I intend to make the cam adjustable, so that it will throw the rake-teeth more or less forward, as desired.

The rake is locked in this working position by means of a spring-bolt, K, which is supported in the hinge-pivot $c$ of the rake-carriage, which is made tubular for this purpose. This bolt is held in place by a small pin, $k$, fitting in a slot in the forward end of the tubular bolt, and both bolt and pin are kept from rotating by means of a short arm, $k'$, extending downward, and held in a forked stop, $c'$, on the rake-carriage C, as shown in Fig. 2 of the drawings.

On one of the rake-teeth is a curved arm, L, extending backward and downward, and provided with notches $l$ at its outer end, as shown in Fig. 4 of the drawings. This arm is arranged so that when the rake is thrown into working position, as heretofore described, the spring-bolt K will engage with one of the notches, as shown in Fig. 2 of the drawings, thereby locking the rake in this position against the reactionary force of the coiled spring $d'$, and the notches should be sufficient in number to permit this locking of the rake, however far forward the teeth may be thrown by the adjustment of the cam $j$.

Upon the incline, and near its upper end, is a switch, M, on a block, $b$. This switch is arranged in the path of the toe $k'$, and is held in position by a pin, $m$. The toe passes just outside or on the front side of the switch as the rake is carried up the incline, pressing to the rear its bent upper end, and the position of the locking-bolt is not disturbed; but upon the return of the rake the toe strikes the upper bent end of the switch, and is carried inward, thereby pushing the locking-bolt back, so as to permit the rake to be turned backward, as above described.

Upon the seat-support, on the supporting-frame of the machine, is an elastic guard or wiper, N, composed of spring-teeth, with a coil $n$, in them, and extending down in the pathway of the rake.

The reel-shaft is mounted upon a vibrating frame, O, on which the bearings $o$ of the reel-shaft are arranged to slide. A link, P, is connected to the lower side of each bearing $o$, and hooked at the other end into one of a series of holes in arms $p$ on the brackets in which the reel-frame is mounted.

It is evident, therefore, that as the frame is vibrated the bearings will be caused to slide back and forth on their supporting-arms, the range of this movement being regulated by the point at which the regulating-links are hooked into the arms $p$. The frame which supports the reel is vibrated by means of a forked arm, Q, connecting it with a hand-lever, $q$, near the seat of the driver.

The reel is driven from the main wheel by chains and sprocket-wheels, supported by a jointed adjustable frame, all of which parts are well known, and need not be particularly described here; but the intermediate sprocket-wheels R and S are not rigidly connected, as usual, but are independent, and united with each other by an ordinary clutch, $r$, a spring, $s$, being placed outside one of the wheels to cause the clutch to engage, but permitting it to yield in the way when the machine is backed, so that the reel will not be revolved.

The operation of my raking device is as follows: The rake, being thrown up into raking position at the outer end of platform, sweeps the latter, and thereby gathers a gavel, which is carried up the incline, and, by the tilting forward of the rake already described, discharged into or upon the receiver outside of the incline. By the continued motion of the drive-chain, the rake is then drawn back, and, soon after it starts down the incline, turned completely backward by the mechanism above described, so that the teeth will lie flat upon the bottom of the platform, in which position it is carried underneath the grain already lying upon the ribs and ways on the platform without disturbing it, until it reaches the extreme outer end of the platform, when it is again thrown up into working position outside of the grain, as already described, and the same operation repeated.

As the gavel is carried up the incline it is compressed against the rake-teeth by the spring-guard N, which yields to permit the rake to pass under it, and then springs back, carrying with it all loose grain clinging to the rake or scattered upon the way.

The operation of the reel supporting and adjusting devices and driving mechanism has already been described.

It will be seen that I obtain a raking device for discharging the grain to the binder in gavels, which, on account of its peculiar movement back and forth in the same path and its peculiar position on its return movement, is exceedingly compact and comparatively simple, while the reel-adjusting mechanism enables me to adjust the reel in both directions by a single lever.

Having thus described the nature and operation of my invention, what I claim, and desire to secure by Letters Patent, is—

1. The spring-catch K, mounted in the tubular pivot $c$, and provided with the toe $k'$, in combination with the forked stop $c'$, substantially as and for the purpose set forth.

2. The rocking rake-shaft D, reciprocating in a single track, in combination with the arm G, cam H, and switch $h$, substantially as and for the purpose set forth.

3. The rocking rake-shaft D, in combination with the forked arm I and spring-stop $i$, substantially as and for the purpose set forth.

4. The spring guard or wiper N, arranged on the elevator-incline, and operating in connection with the reciprocating rake D, substantially as described.

5. The curved guide J, in combination with a cam, $j$, and the rake-tooth $d$, provided with a pin, $d^2$, substantially as and for the purpose set forth.

6. The hinged reel-supporting frame O, in combination with the sliding reel-shaft bearings $o$ and the adjusting-link P, attached to the bearings at one end and connected to the main frame at the other, substantially as and for the purpose set forth.

7. The hand-lever $q$, in combination with the forked arm Q, vibrating frame O, sliding bearings $o$, and adjusting-link P, substantially as and for the purpose set forth.

RICHARD EMERSON.

Witnesses:
ELIJAH H. DUNHAM,
DILLON S. BROWN.